(12) United States Patent
Hainzl et al.

(10) Patent No.: US 7,614,353 B2
(45) Date of Patent: Nov. 10, 2009

(54) SOWING DEVICE

(75) Inventors: Josef Hainzl, Andorf (AT); Christian Stiegler, Berg im Attergau (AT); Franz Spiesberger, Lohnsburg (AT); Andreas Egger, Raab (AT); Franz Diermaier, Taiskirchen (AT); Walter Dullinger, Neuhofen im Innkreis (AT)

(73) Assignee: Wintersteiger AG, Ried im Innkreis (AT)

( * ) Notice: Subject to any disclaimer, the term of this patent is extended or adjusted under 35 U.S.C. 154(b) by 0 days.

(21) Appl. No.: 12/288,799

(22) Filed: Oct. 23, 2008

(65) Prior Publication Data

US 2009/0107369 A1 Apr. 30, 2009

(30) Foreign Application Priority Data

Oct. 24, 2007 (AT) .............................. A 1726/2007

(51) Int. Cl.
*A01C 7/00* (2006.01)
*A01C 15/00* (2006.01)
(52) U.S. Cl. .................. 111/199; 111/200; 111/903; 111/904; 111/921; 111/922
(58) Field of Classification Search ................ 111/199, 111/200, 903, 904, 919, 921, 922
See application file for complete search history.

(56) References Cited

U.S. PATENT DOCUMENTS 5,165,351 A 11/1992 Billings
6,305,303 B1 10/2001 Wright et al.

FOREIGN PATENT DOCUMENTS

| EP | 0 218 145 | 4/1987 |
| EP | 1 785 024 | 5/2007 |
| JP | 2003143905 A * | 5/2003 |

* cited by examiner

*Primary Examiner*—Christopher J. Novosad
(74) *Attorney, Agent, or Firm*—Collard & Roe, P.C.

(57) ABSTRACT

A sowing device having a travelling framework (2) is described, which comprises a storage roll (3) for a seed strip (4) equipped with individual grains (5) of a seed, and an unwinding unit (6) for the seed strip (4) drivable as a function of the travel distance. To ensure a precise deposit of the seed grains (5), it is suggested that a sensor (15) for the individual grains (5) in the seed strip (4) be provided in the area of the seed strip section (14) between the unwinding unit (6) and a ground-proximal deflection roll (8), and a control unit (16), connected on one hand to the sensor (15) and on the other hand to a travel distance encoder (18), activate the drive (17) of the unwinding unit (6) as a function of the difference between the actual location of the seed grains (5) detected by the sensor (15) and a setpoint location predefinable with the aid of the travel distance encoder (18).

4 Claims, 2 Drawing Sheets

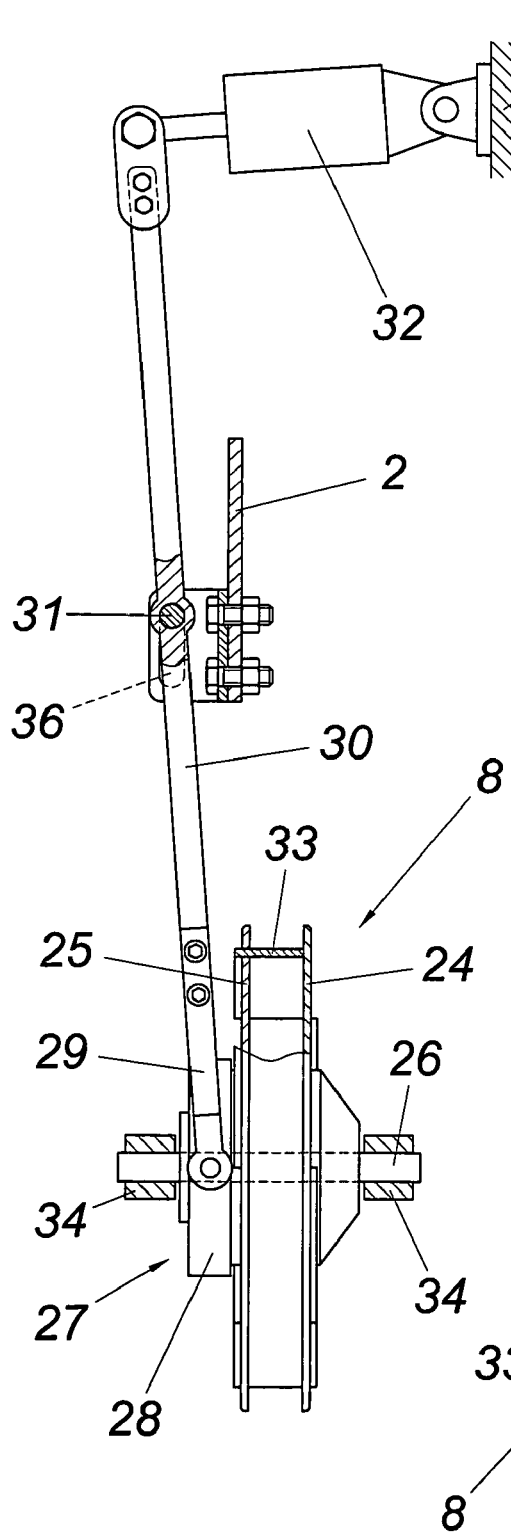
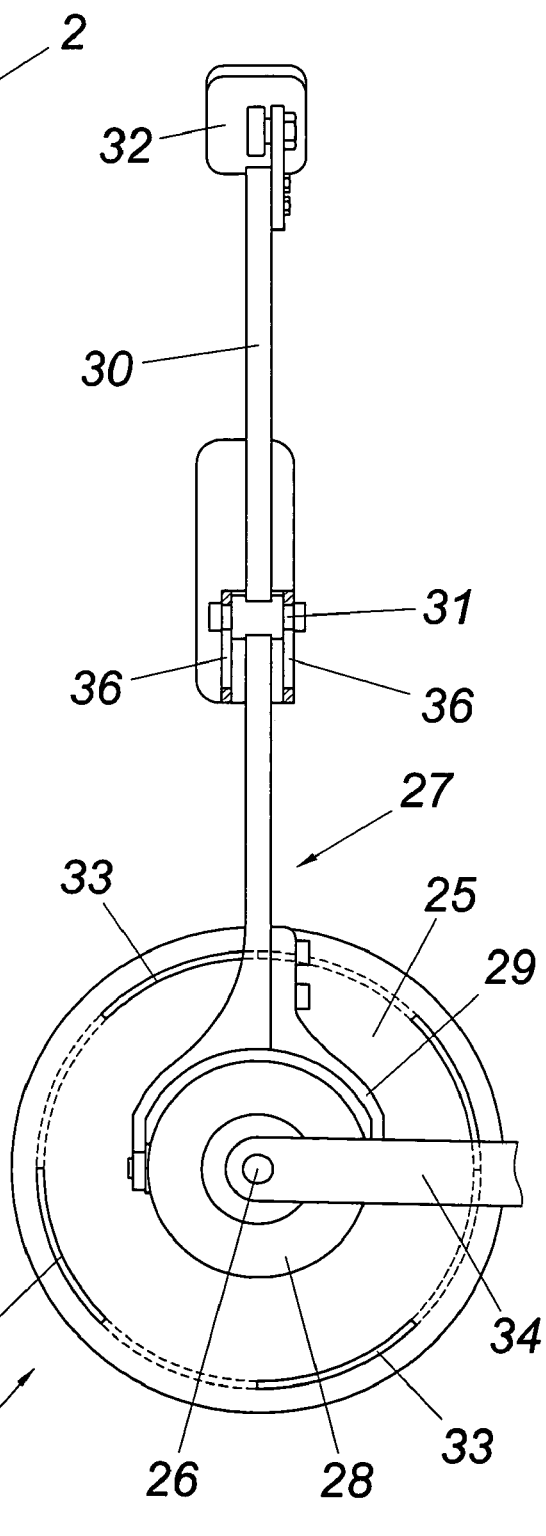

SOWING DEVICE

CROSS REFERENCE TO RELATED APPLICATIONS

Applicants claim priority under 35 U.S.C. §119 of Austrian Application No. A 1726/2007 filed on Oct. 24, 2007.

FIELD OF THE INVENTION

The invention relates to a sowing device having a travelling framework, which comprises a storage roll for a seed strip equipped with individual grains of a seed, and an unwinding unit for the seed strip drivable as a function of the travel distance.

DESCRIPTION OF THE PRIOR ART

To be able to ensure germination and growth conditions corresponding to cultivation purposes for the individual grains of a seed in particular, it is necessary to be able to introduce the seed grains into the earth at an interval which is as predefined as precisely as possible. For this purpose, laying the individual grains of the seed, which are embedded at a precise mutual interval in a seed strip, with the aid of the seed strip in a seed furrow is known (U.S. Pat. No. 6,305,303 B1). The seed strip is drawn off from a storage roll and laid in a seed furrow opened with the aid of a plow blade, which is closed after the laying of the strip by pressing discs, which convey the ejected earth back into the seed furrow. The unwinding unit provided for drawing the seed strip off of the storage roll comprises two revolving conveyors, between whose conveyor sections, which face toward one another, the seed strip is guided. The unwinding unit is controlled as a function of the travel distance, which is ascertained with the aid of a distance encoder roll. This known sowing device has the disadvantage that in spite of the unwinding unit controlled by the travel distance, the required precision in regard to the laying interval of the individual grains may not be achieved, because the longitudinal stretching of the strip during the sowing procedure is not taken into consideration.

SUMMARY OF THE INVENTION

The invention is thus based on the object of implementing a sowing device of the type described at the beginning in such a way that, independently of the possibly occurring longitudinal stretching of the seed strip, a sufficiently precise laying interval of the individual grains within the seed furrow may be ensured The invention achieves the stated object in that a sensor for the individual grains in the seed strip is provided in the area of the seed strip section between the unwinding unit and a ground-proximal deflection roll, and a control unit, which is connected on the one hand to the sensor and on the other hand to a travel distance encoder, activates the drive of the unwinding unit as a function of the difference between the actual location of the seed grains detected by the sensor and a setpoint location predefinable with the aid of the travel distance encoder.

Because the actual location of the individual seed grains is detected upon their conveyance between the unwinding unit and a ground-proximal deflection roll with the aid of a sensor provided for this purpose, and the distance to be covered by the seed grains from the sensor into the seed furrow is constructively predefined by the course of the seed strip, the point at which the individual seed grains come to rest within the seed furrow may be predicted with high precision if the load conditions of the strip do not significantly change during the time span from the detection of the individual grains until their introduction into the seed furrow, which may be assumed. Any possible difference between the predefined setpoint deposit, which may be determined on the basis of a travel distance encoder, and the actual deposit of the individual grains may be ascertained with the detection of the actual location of the individual seed grains during their conveyance in the seed furrow and the actual value, connected thereto, of the deposit point in the seed furrow, and this difference may be used for the control of the unwinding unit for the seed strip, so that if this setpoint-actual value difference is worked out, a correspondingly precise seed deposit in the seed furrow may be ensured, independently of the particular load of the seed strip.

To be able to determine not only the precise interval between the individual grains, but rather also the laying position of the first seed grain to be laid in a seed furrow, the particular location of the first seed grain in the run direction of the seed strip after cutting through the seed strip at the end of a seed furrow is to be predefined. For this purpose, the deflection roll may simply have two guide discs, which accommodate the seed strip between them, one of which is mounted fixed in place and the other of which is mounted so it is axially displaceable on the axis of the deflection roll, an actuator engaging on the axially displaceable guide disc, so that the seed strip may be clamped fixed in place within the deflection roll by a corresponding actuation of this actuator. Because the clamping of the seed strip may be performed as a function of the actual location of the seed grains detected by the sensor, the location of the first seed strip in the run direction after cutting through the seed strip at the end of a seed furrow is fixed. The individual seed grains may therefore be deposited at a predefined setpoint depositing point when they are laid in a new seed furrow. Because, at the beginning of the sowing procedure, the seed strip laid in the open seed furrow may not be held or may not be held adequately by the earth reclosing the seed furrow, the deflection roll may be mounted so it is adjustable in height in the framework, to additionally use the deflection roll as a pressing roll, with the aid of which the seed strip drawn off from the storage roll may be laid securely in the seed furrow at the beginning of a sowing procedure, before the earth reclosing the seed furrow makes this pressing procedure superfluous.

The height adjustment of the deflection roll may be constructively implemented in various ways. Especially simple construction conditions result, however, if the deflection roll is mounted on a rocker adjustable using a pivot drive.

BRIEF DESCRIPTION OF THE DRAWING

The object of the invention is shown for exemplary purposes in the drawing. In the figures:

FIG. 2 shows the deflection roll for the seed strip having the actuator for the axially displaceable guide disc in a partially cutaway front view, and FIG. 3 shows the deflection roll according to FIG. 2 in a side view.

DESCRIPTION OF THE PREFERRED EMBODIMENT

Figure 1:
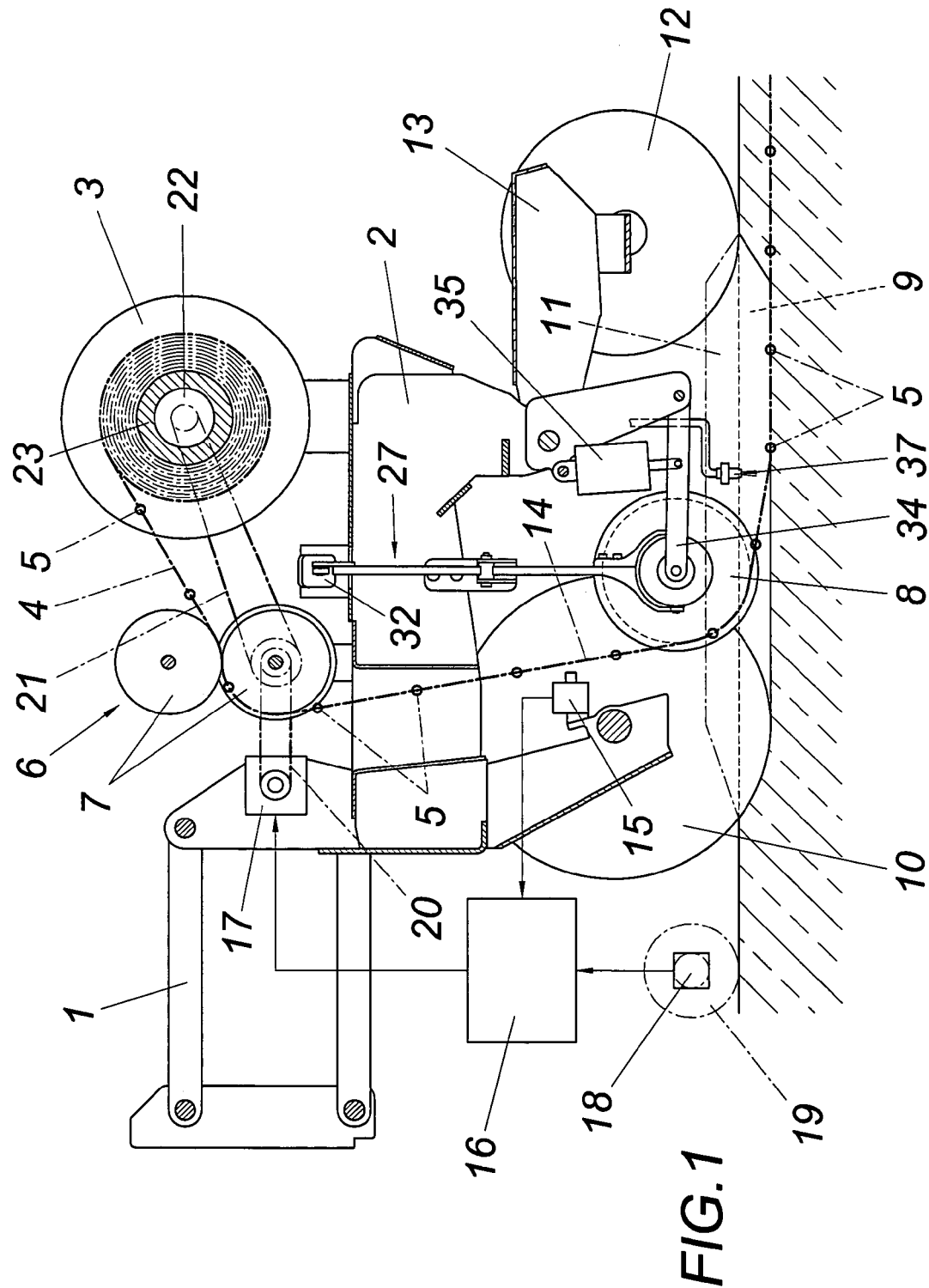
FIG. 1 shows a sowing device according to the invention in a schematic longitudinal section.

The sowing device according to the exemplary embodiment shown has a framework 2, attached to a mounting unit 1 of a tractor (not shown), in particular to a three-point hitch, which carries a storage roll 3 for a seed strip 4, which accommodates individual grains 5 embedded at a predefined longitudinal interval. This seed strip 4 is drawn off of the storage roll 3 with the aid of an unwinding unit 6 made of two drawing-off rolls 7 and fed to a ground-proximal deflection roll 8, to be laid in a seed furrow 9, which is opened with the aid of two disc shares 10. The earth 11 ejected by the disc shares 10, which is indicated by dot-dash lines, is conveyed back into the seed furrow 9, following the laying of the seed strip 4 in the seed furrow 9, by pressing rolls 12 which are mounted on a boom 13 of the framework 2.

In order that the individual seed grains 5 may be deposited at a predefined set-point location in the seed furrow 9, a sensor 15 for detecting the individual seed grains is assigned to the section 14 of the seed strip 4 between the unwinding unit 6 and the deflection roll 8. The sensor 15 impinges a control unit 16 for the drive 17 of the unwinding unit 6. The control unit 16 is additionally connected to a distance encoder 18, which is indicated as a jockey wheel 19 rolling on the ground, but this is not compulsory. The distance data detected via the jockey wheel 19 may at least be checked on the basis of a satellite-supported navigation system, if the position coordinates provided via such a navigation system are insufficiently precise and no additional reference signal is available.

Because the distance of the individual seed grains 5 from the sensor 15 to the deposit location in the seed furrow 9 predefined by the course of the seed strip 4 is predefined, the later deposit point in the seed furrow 9 may be specified upon the detection of the actual location of an individual seed grain 5 by the sensor 15, with the proviso that the load conditions for the seed strip do not significantly change during the conveyance of this seed grain. The control unit 16 may predefine a setpoint value for the deposit of the individual seed grains 5 with the detection of the travel distance by the travel distance encoder 18. The response of the sensor 15 determines the actual value of this deposit, so that by a comparison of the setpoint-actual value difference, by a corresponding activation of the drive 17 of the unwinding unit 6, a precise deposit of the seed grains 5 in the seed furrow 9, which is largely independent of the load conditions of the seed strip 4, may be ensured.

The drive 17 for the unwinding unit 6 comprises a chain drive 20 according to the exemplary embodiment shown, by which a chain drive 21 supporting the rotational movement of the storage roll 3 is guided further. However, because the speed of the storage roll 3 changes with the change of the coil diameter of the seed strip 4, the chain drive 21 is connected to the shaft 23 of the storage roll 3 via a free wheel 22 (not shown in greater detail). The configuration is made in such a way that as the seed strip 4 unwinds, the decisive peripheral velocities of the drawing-off rolls 7 and the storage roll 3 correspond. The free wheel 22, which is active opposite to the unwinding direction, allows the storage roll 3 to lag in relation to the chain drive 21 in the event of a corresponding larger diameter of the strip coil, so that the seed strip 4 may be unwound from the storage roll 3 at the unrolling velocity predefined by the drawing-off roll 7, and at a comparatively low drawing-off resistance. In addition, the free wheel 22 prevents the storage roll 3 from continuing to rotate in the event of abrupt braking of the traction vehicle.

As may be inferred from FIGS. 2 and 3 in particular, the deflection roll 2 comprises guide discs 24 and 25 for the seed strip 4 to be deflected. While the guide disc 24 is mounted fixed in place on the axis 26 of the deflection roll 8, the opposing guide disc 25 is retained so it is axially displaceable, to be able to clamp the seed strip 4 between the guide discs 24 and 25. An actuator 27 is provided to actuate this clamping unit, which comprises a fork 29, linked so it is pivotable on a bearing housing 28 for the adjustable guide disc 25, which is fastened at the end of a double-arm actuating lever 30. The pivot axis of the lever 30 is identified by 31. The pivot adjustment of the double-arm lever 30 occurs via an actuating cylinder 32 linked to the framework 2. Upon an impingement of the actuating cylinder 32, the double-arm actuating lever 30 is pivoted and the bearing housing 28 is thus pressed against the fixedly retained guide disc 24, with the effect that the seed strip 4 running between these guide discs 24 and 25 is clamped onto the deflection disc 8. The rotationally-fixed axis 26 of the deflection roll additionally carries a brake disc, against which the axially displaceable guide disc 25 is pressed upon clamping of the seed strip 4, so that the deflection roll is also prevented from rotating further with the clamping of the seed strip 4 and the seed strip is fixed in a predefined location. The rotation of the guide discs 24 and 25, which are connected to one another via guide webs 33, is not obstructed by the linkage of the fork 29 on the bearing housing 28, because the bearing housing 28 accommodates a pivot bearing for the guide disc 25.

In order that the seed strip 4 clamped in the deflection roll 8 may be pressed into the seed furrow 9 at the beginning of a sowing procedure, the deflection roll 8 is mounted so it is adjustable in height in the framework 2. For this purpose, a rocker 34 is provided, which is adjusted with the aid of a pivot drive 35. Using the impingement of the pivot drive 35, implemented as an actuating cylinder, the deflection roll may thus be lowered from the location shown in FIG. 1 into a position in which the seed strip 4 is pressed into the seed furrow 9 at the beginning of the sowing procedure, as long as the earth reclosing the seed furrow 9 is incapable of sufficiently fixing the seed strip 4 in the seed furrow 9. To take the height adjustment of the deflection roll 8 in the area of the actuator 27 for the deflection roll 8 into consideration, the pivot axis 31 of the double-arm lever 30 is guided so it is displaceable in height in an oblong hole 36.

In order that the seed strip 4 may be cut through after depositing a precisely predefined number of seed grains 5 at the end of a seed furrow 9, a cutting unit 37 is situated after the deflection roll 8, which is implemented as a water jet cutting nozzle according to FIG. 1, but this is in no way obligatory. This cutting unit 37 is impinged concurrently with the actuator 27 for the clamping of the seed strip 4, via the control unit 16.

The invention claimed is:

1. A sowing device having a travelling framework (2), which comprises a storage roll (3) for a seed strip (4) equipped with individual grains (5) of a seed, and an unwinding unit (6) for the seed strip (4) drivable as a function of the travel distance, wherein a sensor (15) for the individual grains (5) in the seed strip (4) is provided in the area of the seed strip section (14) between the unwinding unit (6) and a ground-proximal deflection roll (8), and a control unit (16), connected to the sensor (15) and to a travel distance encoder (18), activates the drive (17) of the unwinding unit (6) as a function of the difference between an actual location of the seed grains (5) detected by the sensor (15) and a setpoint location predefinable via use of the travel distance encoder (18).

2. The sowing device according to claim 1, wherein the deflection roll (8) has two guide discs (24, 25), which accommodate the seed strip (4) between them, one of which is mounted fixed in place and the other of which is mounted so it is it axially displaceable on the axis (26) of the deflection roll (8), and an actuator (27) engages on the axially displaceable guide disc (25).

3. The sowing device according to claim 1, wherein the deflection roll (8) is mounted to be adjustable in height in the framework (2).

4. The sowing device according to claim 3, wherein the deflection roll (8) is mounted on a rocker (34) adjustable using a pivot drive (35).

* * * * *